United States Patent [19]

Immega

[11] Patent Number: 5,317,952
[45] Date of Patent: Jun. 7, 1994

[54] TENTACLE-LIKE MANIPULATORS WITH ADJUSTABLE TENSION LINES

[75] Inventor: Guy Immega, Vancouver, Canada

[73] Assignee: Kinetic Sciences Inc., Vancouver, Canada

[21] Appl. No.: 990,175

[22] Filed: Dec. 14, 1992

Related U.S. Application Data

[63] Continuation-in-part of Ser. No. 796,422, Nov. 11, 1991, Pat. No. 5,181,452.

[51] Int. Cl.⁵ .................. F15B 11/08; F15B 13/04; F01B 19/00
[52] U.S. Cl. .......................... 91/418; 92/34; 92/43; 74/479 BF; 901/22; 901/23
[58] Field of Search ............ 92/34, 35, 43, 44, 92; 74/479 BF; 901/21, 23; 414/680, 729; 91/418

[56] References Cited

U.S. PATENT DOCUMENTS

| | | |
|---|---|---|
| 3,060,972 | 10/1962 | Sheldon . |
| 3,497,083 | 2/1970 | Anderson et al. . |
| 4,393,728 | 7/1983 | Larson et al. .......................... 74/469 |
| 4,494,417 | 1/1985 | Larson et al. .............. 74/479 BF X |
| 4,551,061 | 11/1985 | Olenick ................. 414/735 |
| 4,815,911 | 3/1989 | Bengtsson et al. ............. 901/21 X |
| 4,939,982 | 7/1990 | Immega et al. ........................ 92/92 |
| 5,083,498 | 1/1992 | Sato et al. ................. 92/92 |
| 5,174,168 | 12/1992 | Takagi et al. ..................... 901/21 X |
| 5,251,538 | 10/1993 | Smith ........................ 92/34 |

FOREIGN PATENT DOCUMENTS

| | | | |
|---|---|---|---|
| 837845 | 6/1981 | U.S.S.R. ............... | 414/729 |
| 1202853 | 1/1986 | U.S.S.R. ............... | 901/21 |
| 1256955 | 9/1986 | U.S.S.R. ............... | 901/21 |
| 1299676 | 3/1987 | U.S.S.R. ............... | 901/21 |
| 1301701 | 4/1987 | U.S.S.R. ............... | 901/21 |
| 1484677 | 6/1989 | U.S.S.R. ............... | 901/21 |

Primary Examiner—Edward K. Look
Assistant Examiner—John Ryznic
Attorney, Agent, or Firm—Brian M. Long

[57] ABSTRACT

A tentacle-like manipulator has a resiliently longitudinally extensible, laterally bendable elongate member, e.g. an inflatable bellows or a helical compression spring-like member, with an end effector mounting on one end thereof. Tendon-like tension members extend along said elongate member and are spaced apart from one another around said elongate member, one end of each of said tension members being to said elongate member at said one end thereof. Guides spaced apart along and secured to said elongate member and slidably engage said tension members for guiding said tension members relative to said elongate member. Further tension members extend along only a portion of the length of the elongate member and are secured to the elongate member at a location intermediate the ends of the elongate member. Winches are used to wind and unwind the tension members to correspondingly control the length and the bending of the elongate member.

7 Claims, 12 Drawing Sheets

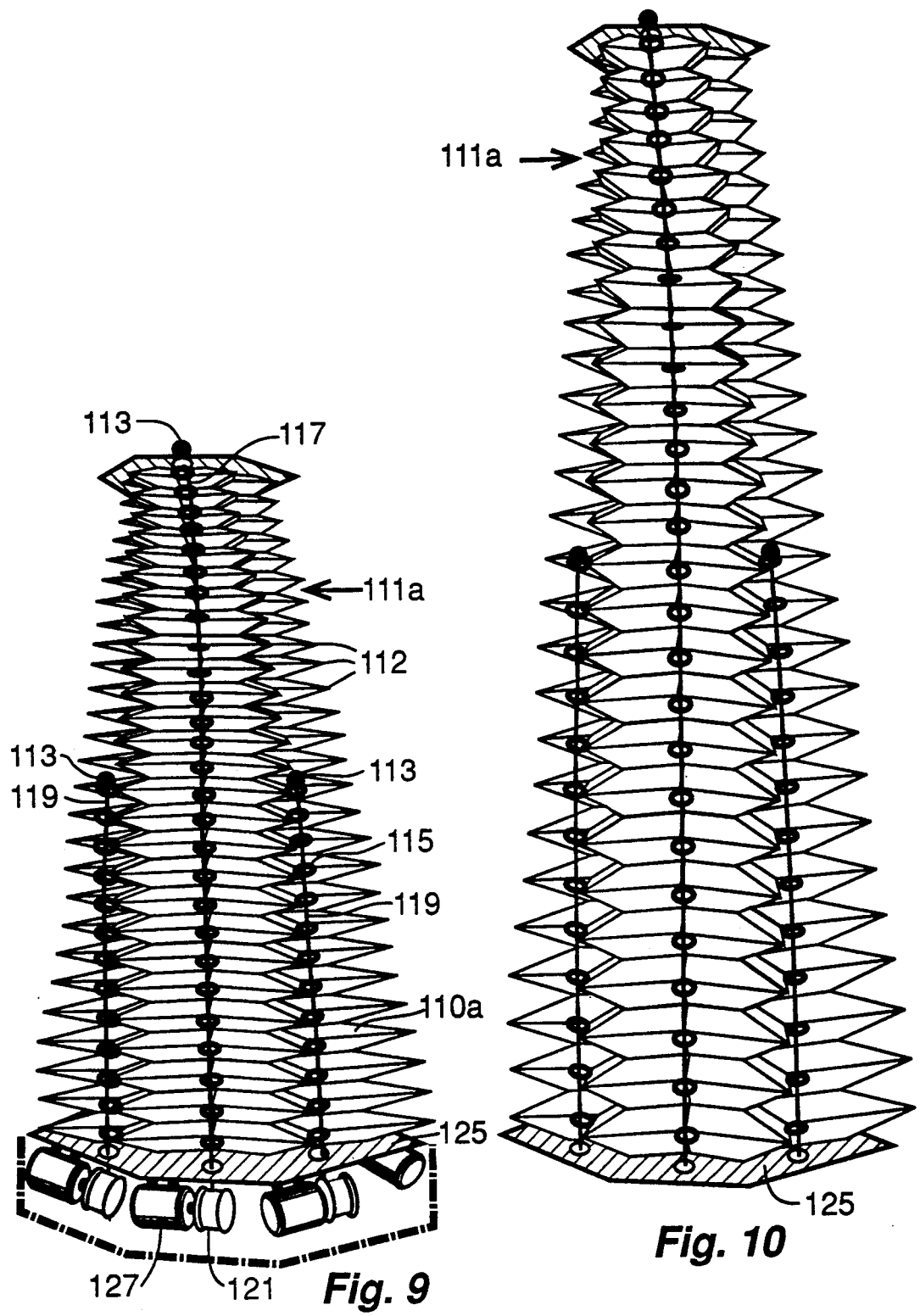

TENTACLE-LIKE MANIPULATORS WITH ADJUSTABLE TENSION LINES

CROSS-REFERENCE TO RELATED APPLICATION

This is continuation-in-part of application Ser. No. 07/796,422 filed Nov. 1, 1991 U.S. Pat. No. 5,181,452.

BACKGROUND OF THE INVENTION

1. Field of the Invention

The present invention relates to tentacle-like manipulators which can bend in at least one plane and which can extend and contract in length.

2. Description of Related Art

Prior art tentacle-like manipulators are disclosed in U.S. Pat. No. 3,060,972 issued Oct. 30, 1962 to Gilbert J. Sheldon for a flexible tube structure of fixed length with opposing cables used to flex the structure; U.S. Pat. No. 3,497,083 issued Feb. 24, 1970 to Victor C. Anderson for a tensor arm manipulator of fixed length comprised of universal joints on pivoting plates with a plurality of tendons connected to selected plates; U.S. Pat. No. 4,393,728 issued Jul. 19, 1983 to Ove Larson and Charles Davidson for a flexible robot arm with stacked convex disks with tendons to control bending; and U.S. Pat. 4,551,061 issued Nov. 5, 1985 to Ralph W. Olenick for a flexible, extensible robot arm with three elastomeric tubes to control extension and bending and rods sense the arm length and curvature.

All of the above-mentioned prior patents disclose variations on tentacle-like manipulator designs which employ multiple joints or segments to approximate continuous curvature of the arm, and which employ cables or differential expansion of tubes to effect bending of the arm.

The important characteristics of tentacle manipulators include strength-to-weight ratio; ability to extend or contract in length (and percent extension/contraction); ability to bend in any direction with controlled curvature; ability to control the radius of bending; ability to allow two or more regions of bending along the length of the arm; provision for varying the compliance (mechanical impedance) of the arm and simplicity of actuation means.

SUMMARY OF THE INVENTION

It is accordingly an object of the present invention to provide a novel and improved tentacle-like manipulator which can extend and contract, and can bend in at least one region of curvature, has a light weight relative to its lifting capacity, and has controllably variable mechanical compliance.

According to the present invention, a tentacle-like manipulator, comprises a resiliently longitudinally extensible, laterally bendable elongate member with a tool mounting on one end of the elongate member and at least two tension members extending along the elongate member and spaced apart from one another around the elongate member. One end of each of the tension members is attached to the elongate member at said one end thereof. A plurality of guides are spaced apart along and secured to the elongate member and slidably engage the tension members for guiding the tension members relative to the elongate member. Means spaced from the securing means are provided for adjustably tensioning the tension members independently of one another and thereby correspondingly longitudinally contracting and bending the elongate member.

In the preferred embodiment of the present invention, the bellows may be constructed so as to be of any practical length, and may be tapered or non-tapered. The kinematic configuration of the manipulator, the amount extension or contraction, the location and direction of bending, and the motion of the manipulator are controlled by the tension members which are in the form of tendon cables which slide parallel to the longitudinal axis of the manipulator. The manipulator is light weight because the bellows uses fluid pressure (preferably gaseous) to attain the needed mechanical rigidity. Since the bellows and the tendon-like cables are under only under tensioning stress, they are not required to be structurally stiff (and thus heavy). The compliance of the bellows can be adjusted by varying the pneumatic pressure within the bellows.

The tendon cables serve to control the elongation and bending of the bellows which forms the body of the manipulator. The tendon cables may be multiple strand steel, or other metal, or synthetic fibres. The tendon cables are preferably arrayed in one or more groups of three cables, with the cables in each group spaced evenly around the periphery of the bellows and running parallel to the axis of the actuator, through guide holes in the guides, which are affixed in the sides of the bellows.

One group of three cables is capable of controlling the extension and bending (in any direction) of one region of the bellows. A group of three cables may e.g. be installed with one end of each of the cables terminating and attached to a region part way along the length of the bellows, and the other ends of the cables are attached to winches or other cable length adjustment means at the proximal end of the bellows. Additional groups of three cables are used for each additional region of bending capability along the length of the bellows. Thus, a bellows capable of bending in any direction in two regions of curvature will require two groups of three cables, i.e. a total of six cables, and a bellows capable of bending in three regions of curvature will require three groups of three cables, i.e. a total of nine cables. However, if it is required that a region of the manipulator bend only back and forth but not in all directions, then a group of cables consisting of only two cables is all that is required. If it is required that a region of the manipulator bend only in a single direction, then only one cable is required. To cause the manipulator to contract in length, a minimum of one cable is required, preferably located on the longitudinal axis of the bellows.

The distribution of the three cables of a group around the periphery of the bellows may be anywhere on the periphery, outside or inside of the bellows and is, preferably evenly spaced, i.e. radially symmetrical through a section of the tentacle body. However, in the preferred embodiment the bellows is formed of star-shaped chambers and the cables are located in the "valleys" of the star-shaped chambers, where they will not protrude or snag. If a total of six cables are employed, i.e. two groups of three, then the bellows preferably has a six-pointed star shape in cross-section, providing six valleys. If a total of nine cables are employed, then the bellows preferably has a nine-pointed star cross-section.

When two or more groups of cables are employed to attain two or more region of curvature of the bellows the groups of cables are somewhat interactive in the control of the bellows. This is because all groups of cables run parallel to each other in a proximal base section of the manipulator. Thus, if overall elongation of the manipulator is required, all cables must be loosened together. Similarly, if a region of the manipulator is to be curved, it may be necessary to adjust the tensioning of two groups of cables to properly effect bending.

An alternative arrangement for the cable control, which is not interactive between groups of cables, is to deploy groups of three cables with each of the groups extending only over a single respective region of the manipulator, i.e. with no parallel overlap of cables near the proximal base of the manipulator. Thus as the cable tensions are adjusted, only a single region of the manipulator will be curved. A disadvantage of this approach is that cable adjustment means must be deployed along the length of the manipulator for each group of cables.

Bellows other than those taught by the above-mentioned patent application Ser. No. 07/796,422 may be employed in the present manipulator. Also, non-bellows members, such as coiled springs (tapered or untapered) may also be used. In both cases, the principles of operation and control of the manipulator are the same.

BRIEF DESCRIPTION OF THE DRAWINGS

Further objects, features and advantages of the present invention will become more readily apparent to those skilled in the art from the following description of the invention when taken in conjunction with the accompanying drawings, in which like reference numerals have been used in different figures to indicate like parts and in which:

FIG. 9 shows a tentacle manipulator in a partially contracted state, according to a second embodiment of the present invention, which is a modification of the manipulator of FIGS. 7 and 8 and which has a relatively greater number of chambers along the axis of the bellows, the motorized winches, pressure source and valve being omitted for clarity;

FIG. 10 shows a view similar to that of FIG. 9, but with the manipulator in an extended condition;

DESCRIPTION OF THE SEVERAL EMBODIMENTS

Figure 1:
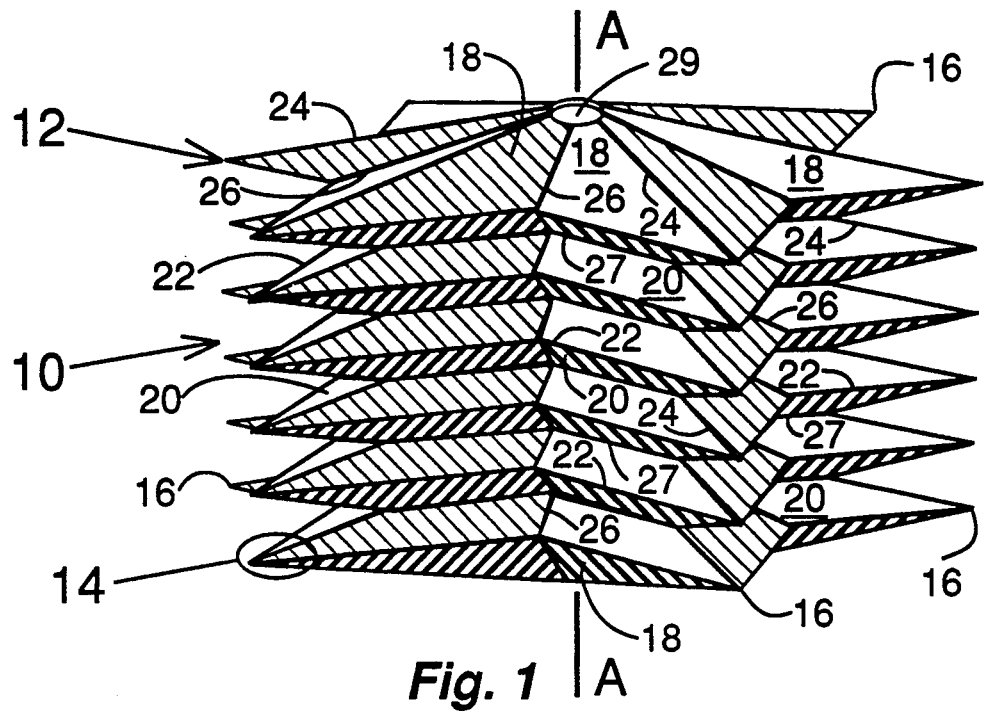
FIG. 1 shows a view in perspective of a bellows for use in a manipulator according to the present invention, the bellows being in a contracted state.
Figure 4:
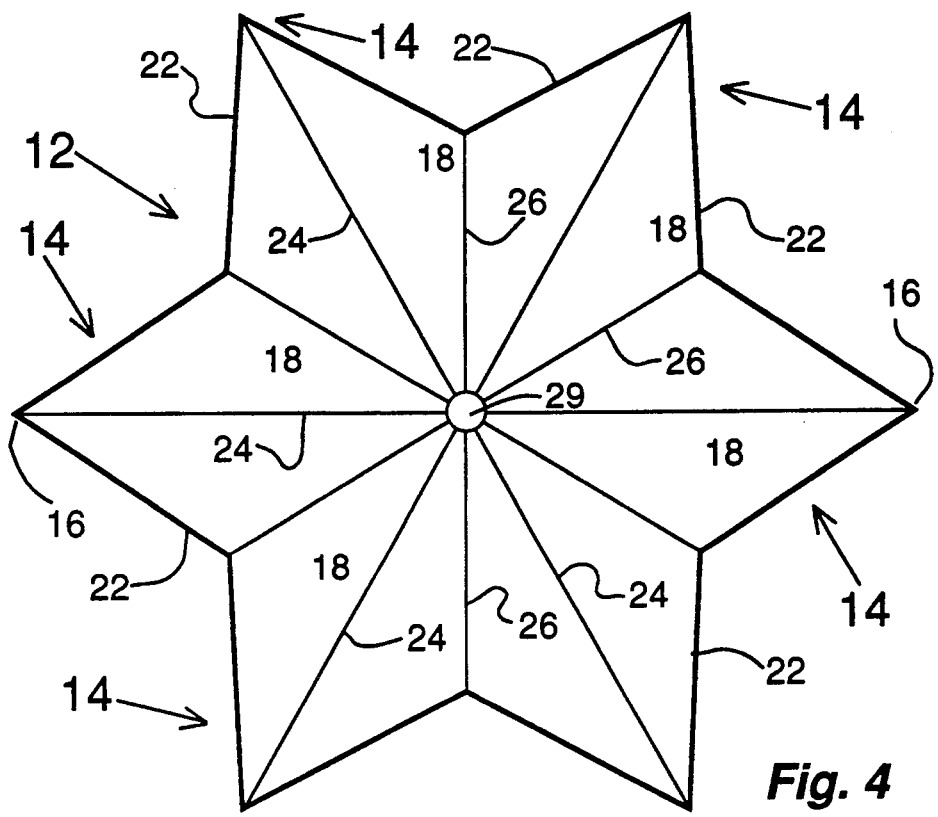
FIG. 4 shows a plan view of the bellows of FIGS. 1 through 3 and FIG. 5.

As shown in FIG. 1 of the accompanying drawings, a bellows indicated generally by reference numeral 10 has six bellows chambers, one of which is shown in FIG. 4 and indicated generally by reference numeral 12, arranged adjacent one another and in succession along the longitudinal axis A of the bellows 10, as shown in FIG. 1. Although the drawings show six chambers along axis A, any number of chambers can be configured along axis A, depending on the length of actuator required. The chambers along axis A form a single hollow enclosure or, alternatively, multiple hollow enclosures.

Each bellows chamber 12 in the present embodiment of the invention is formed of six chamber segments indicated generally by reference numeral 14 and most clearly apparent in FIG. 4, which are arranged around a longitudinal axis A of the bellows 10.

Each chamber segment 14 forms a radially outwardly extending protrusion tapering outwardly to an apex 16 and as can be seen, in particular in FIG. 4, the six chamber segments 14 form a star-shaped array about the axis A.

The chamber segments 14 at opposite ends of the actuator each have two substantially triangular wall portions 18, facing longitudinally outwardly from the bellows 10, and a second pair of wall portions 20, which are quadrilateral.

The remainder of the chamber segments 12 are each formed by two pairs of the quadrilateral wall portions 20.

The wall portions 18 and 20 are portions of a bellows wall or bladder forming the bellows 10 and made, in the present embodiment of the invention, of woven fibres of Kevlar or Nylon or other flexible fibre bonded with rubber or plastic material to form an impermeable membrane which can accommodate fluid pressure from a gaseous or liquid medium. Ideally, the bladder membrane should be flexible and impermeable but with little or no elastomeric stretch.

In each chamber segment, the wall portions 20, or 18 and 20, as the case may be, merge with one another along first fold lines 22 which extend peripherally around each of the chambers 12 and form a six-pointed star-shaped periphery, as shown in FIG. 4. Thus, each of the chamber segments 14 has a pair of the first fold lines 22 converging outwardly to the respective apex 16.

The wall portions 20, or 18 and 20, of each chamber segment 14 also merge along upper and lower second fold lines 24, which extend radially outwardly. Each chamber segment 14 has two fold lines 24, in a plane containing the axis A, which converge radially outwardly to the respective apex 16.

It will be apparent from consideration of the drawings that each chamber segment 14 is of convex polyhedral shape. The wall portions 20 of each chamber 12 merge with those of the adjacent chamber segments 20 along radially extending third fold lines 26.

The wall portions 20 of each chamber 12 also merge with those of the adjacent chamber or chambers 12 along fourth fold lines 27 (FIG. 3), which are parallel to, and spaced radially inwardly from, respective ones of the first fold lines 22.

The first and fourth fold lines 22 and 27 lie in planes which are perpendicular to the axis A.

Figure 2:
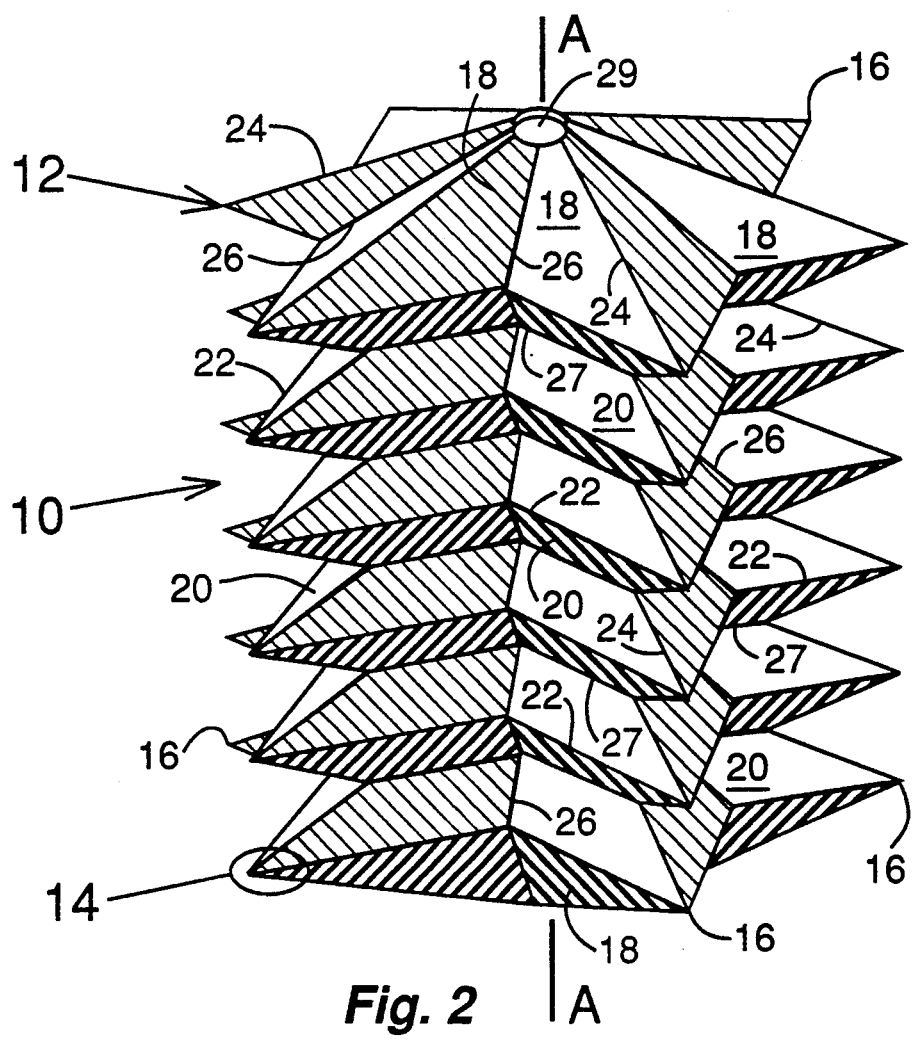
FIG. 2 shows a view similar to that of FIG. 1, but with the bellows in an expanded condition.

FIG. 1 shows the bellows in a partially collapsed condition, whereas FIG. 2 shows the bellows 10 in an expanded condition.

The expansion of the bellows 10 is effected by supplying pressurized fluid to the interior of the bellows through a nipple 28 inserted into an opening 29 formed in one end of the bellows 10.

As the bellows 10 expands longitudinally, from the contracted state shown in FIG. 1 to the extended or expanded state shown in FIG. 2, the wall portions 18 and 20 unfold somewhat about the fold lines 22, 24, 26 and 27. As this occurs, the volume of the interior of the bellows 10 increases, without requiring elastic deformation or buckling of the wall of the bellows, and the circumference of the bellows 10 decreases.

In practice, when fluid under pressure is admitted to the interior of the bellows 10, the flexible membrane forming the wall portions 18 and 20 will tend to bulge convexly, somewhat distorting the geometry of the bellows 10. However, this bulging distortion does not affect the basic folding articulation action of the wall portions 18 and 20 about the fold lines 22, 24, 26 and 27 as the bellows 10 elongates.

Figure 3:
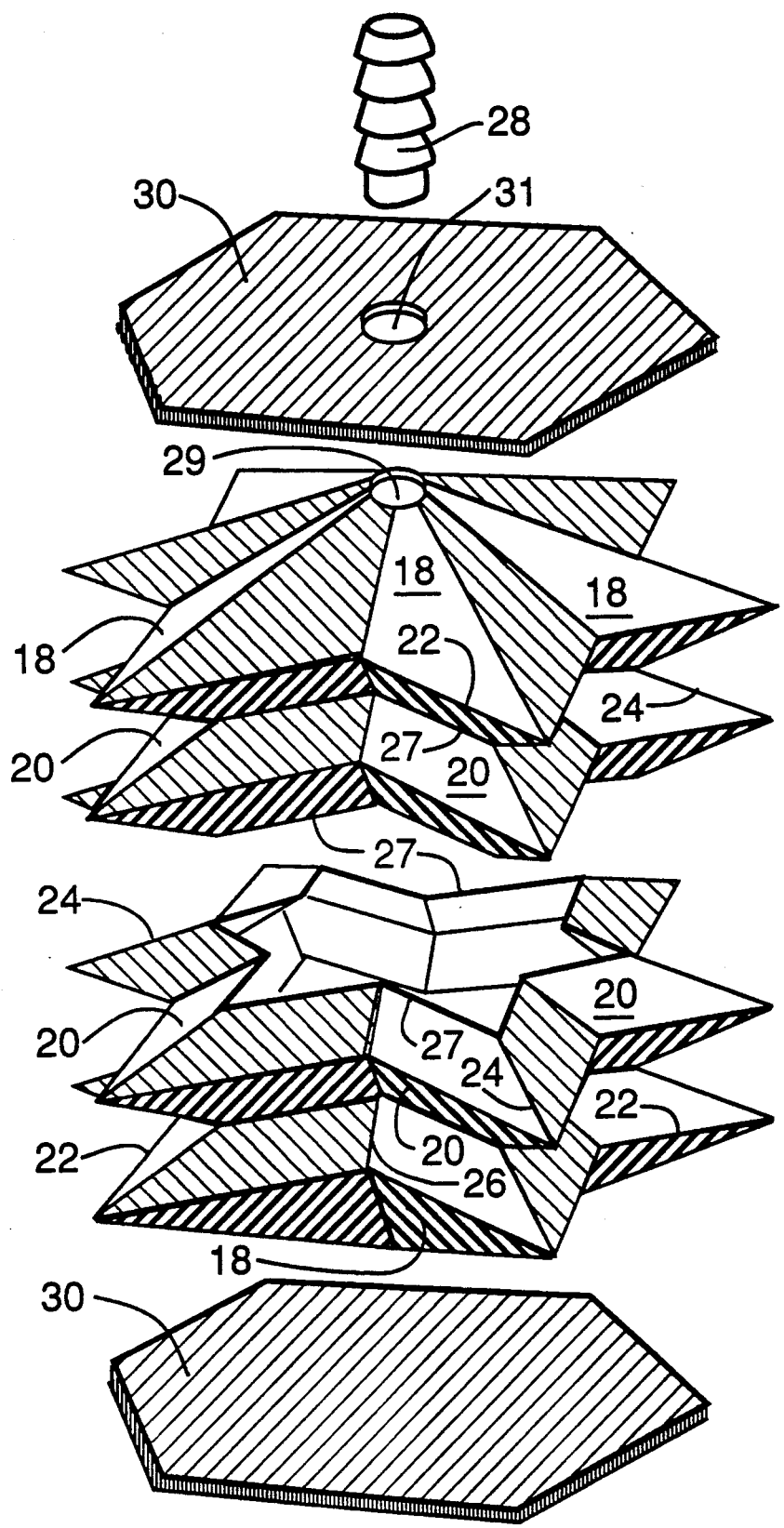
FIG. 3 shows a view corresponding to that of FIG. 2, but with parts of the expanded bellows omitted to show the interior and with associated parts illustrated in an exploded manner.

In FIG. 3, two of the chambers 12 have been omitted to show the hollow interior of the bellows and also to show the shapes of the fourth fold lines 27.

Hexagonal pressure plates 30 at opposite ends of the bellows are located adjacent the longitudinally outwardly facing sides, formed by the wall portions 18, of the endmost ones of the chambers 12 and serve to transmit force from the latter on extension of the bellows 12. In the preferred embodiment, the upper pressure plate 30 has a hole 31 for receiving the nipple 28. The pressure plates 30 need not be hexagonal, but may be any surface onto which the actuator may exert pushing force. Aperture 29 may also be located anywhere on bladder surfaces 18 or 20, rather than at the end of the bellows.

For optimum extensibility with minimum shear stress in the membrane of the bellows 10, there is an optimum ratio of the lengths of the third and second fold lines 26 and 24. This ratio equals the length of third fold line 26 divided by the length of second fold line 24.

More particularly, for the six pointed embodiment shown in FIGS. 1 through 6, the optimum ratio of the length of the fold lines 26 and 24 is the dimensionless number 0.61, approximately.

Ratios varying from the optimum will work well also, but with reduced axial extensibility of the actuator and increased shear stress in the membrane, requiring the membrane to be more elastic and therefore causing the membrane to be less strong.

Star-shaped patterns with other than the six pointed configuration shown in FIGS. 1 through 6 also work well. Thus, specific shapes with three or more points work well. Depending on the number of points in the star, there is a specific preferred embodiment for the dimensionless ratio of the lengths of the fold lines 26 and 24. Table 1 below provides samples of the approximate preferred ratios for star-shaped patterns with various numbers of points, derived by experimentation:

TABLE 1

| Number of Points | Ratio |
|---|---|
| 3 | .3 |
| 4 | .45 |
| 5 | .545 |
| 6 | .61 |
| 7 | .66 |
| 8 | .7 |
| 9 | .745 |
| 10 | .75 |
| 11 | .78 |
| 12 | .8 |
| 13 | .814 |
| 14 | .827 |
| 15 | .833 |
| 16 | .84 |
| 17 | .848 |
| 18 | .856 |
| 19 | .863 |
| 20 | .87 |
| 30 | .912 |
| 40 | .935 |
| 60 | .955 |
| 80 | .965 |
| 100 | .973 |
| 200 | .986 |

Figure 5:
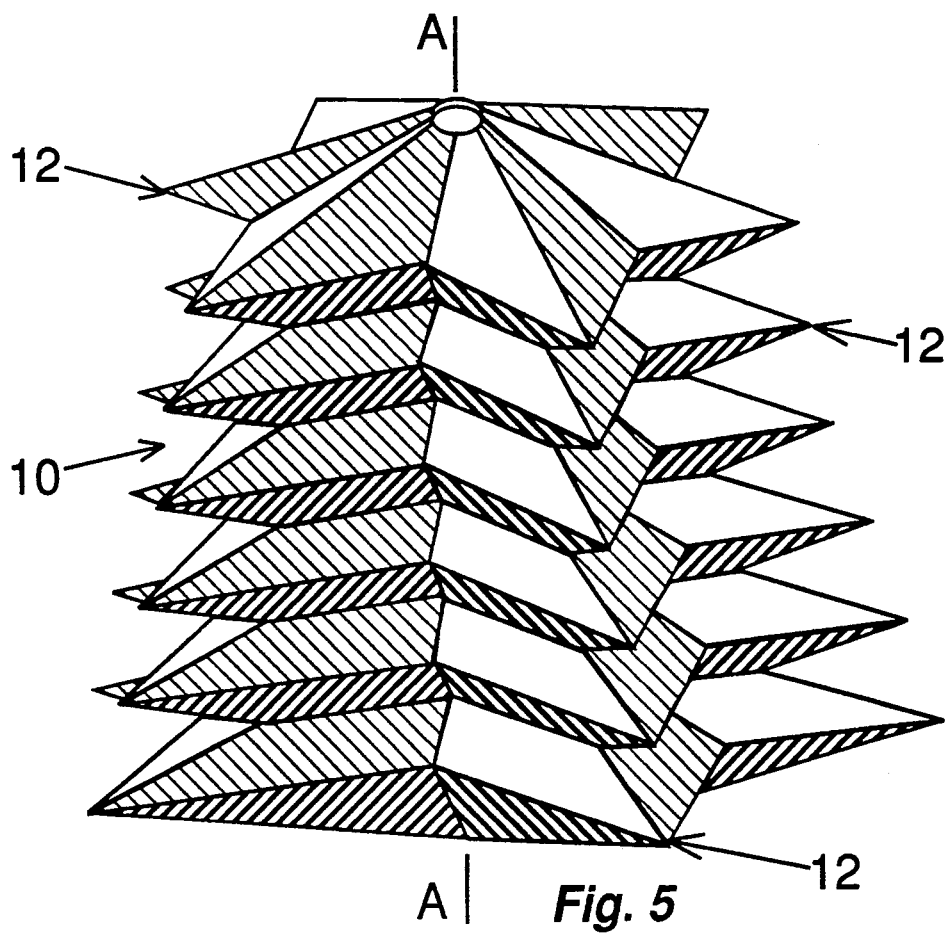
FIG. 5 shows a view similar to that of FIG. 2, but with the bellows tapered along its length.

In contrast to the extended actuator shown in FIG. 2, FIG. 5 shows an extended actuator with chambers 12 along axis A which are similar but successively different in size, providing a tapered actuator bladder 10. Actuators with chambers varying in size in any manner can be arrayed along axis A.

Figure 6:
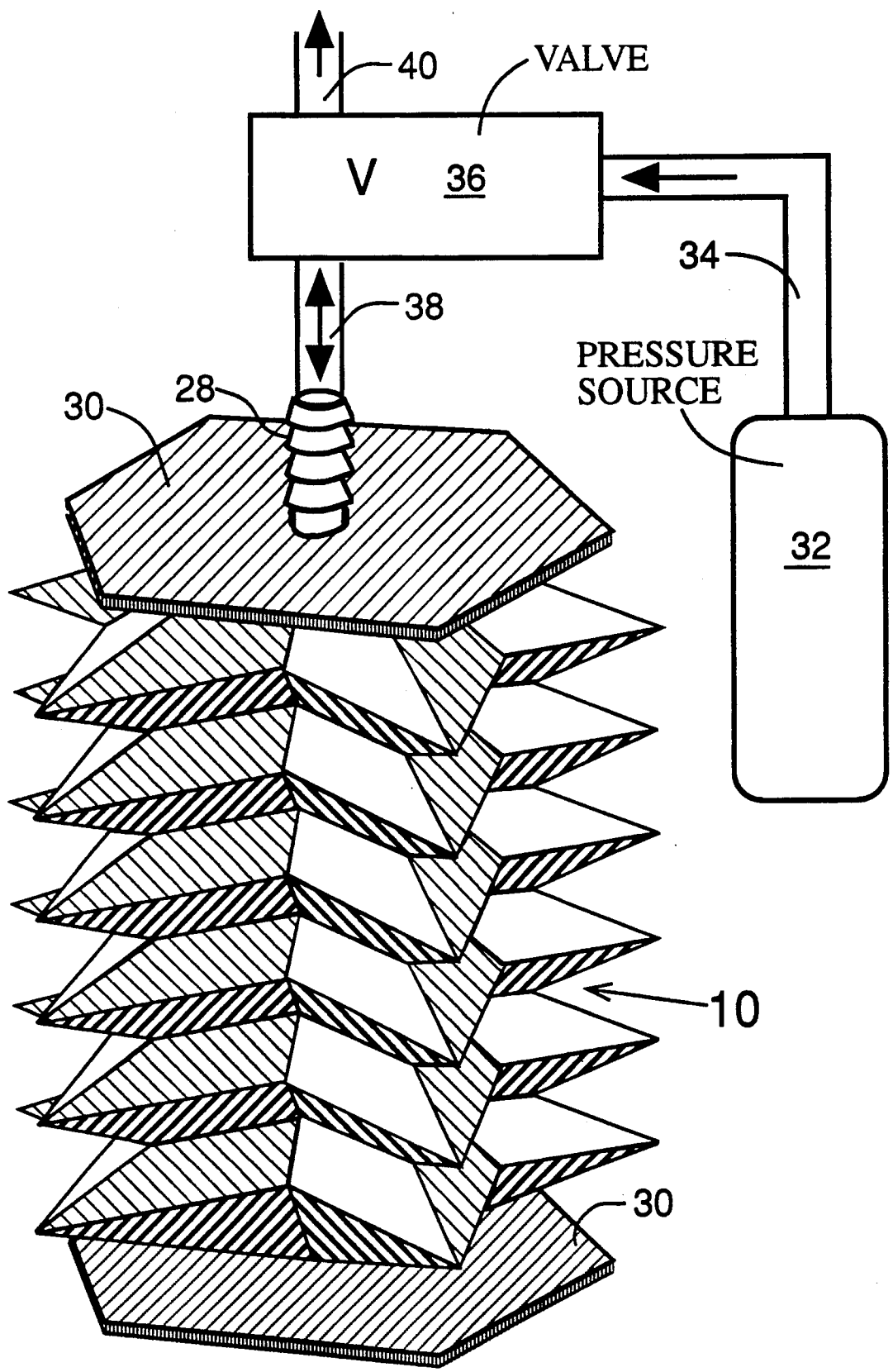
FIG. 6 shows a view in perspective of a complete bellows actuator with a source of pressurized fluid and a controlling valve.

FIG. 6 shows a complete bellows actuator including the bellows 10, the end plates 30 and the nipple 28. In addition, FIG. 6 shows a source of fluid pressure 32, a tube 34 connecting the fluid pressure source 32 to a fluid valve 36, a tube 38 connecting the valve 36 to nipple 38, and a fluid exhaust tube 40.

To cause the actuator bellows to expand in length, the valve 36 directs pressurized fluid from the source 32 to the nipple 28, thereby passing pressurized fluid into the hollow enclosure of bellows 10.

To cause the bellows actuator to contract in length, the valve 36 shuts off fluid flow from the pressure source 32 and directs pressurized fluid from the enclosure of the bellows 10 to the exhaust tube 40.

Other pressure and valve schemes will be obvious to those skilled in the art of pneumatics or hydraulics.

A theoretical examination of the present actuator involves an energy analysis. An energy analysis can equate the work done by the fluid in the interior of the bellows 10 to the work done by the expanding actuator on its pressure plates 30 because of the minimal elastic strain energy accompanying polyhedra articulation. Thus, the force on a load attached to the pressure plates 30 is given by the following:

$$Fa = -PdV/dL$$

where:
V = volume of the enclosure
L = length of the enclosure
P = fluid pressure in the enclosure On the basis of the above analysis, force verses expansion, maximum expansion, etc., can be determined by computing the geometrical behaviour of the articulating bellows 10 as it elongates.

Articulation with minimal deformation can also be ensured by testing specific bellows designs, which embody the present invention, by computing geometrical behaviour. Generally, somewhat larger forces are achieved at the beginning of elongation, diminishing as the actuator elongates and dropping to zero as the actuator bellows reaches is maximum volume state.

By appropriate choice of the number of segments per chamber (i.e. the number of star points), the ratio of the third and second fold line lengths 26 and 24 and the number of chambers 12, and also the taper between the segments, one can tailor specific aspects of actuator behaviour, such as maximum expansion, magnitude of axial force and radial size, exhibiting a versatility which distinguishes the present actuator for prior art bellows actuators. Specific designs can be obtained which exhibit greater than 250% maximum extension.

Figure 7:
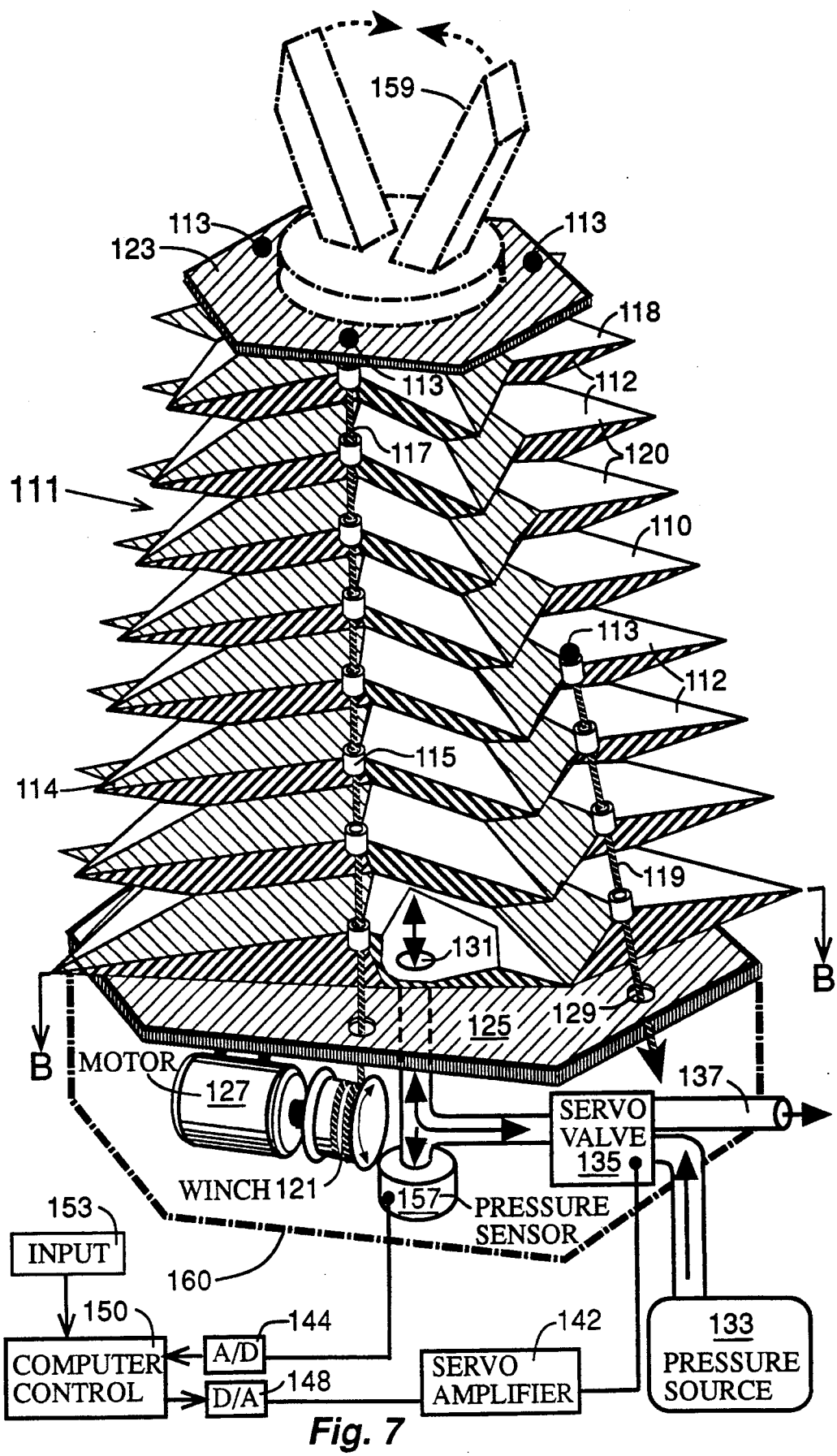
FIG. 7 shows a view in perspective of a tentacle manipulator in a partially contracted state, according to a first embodiment of the present invention, with said tentacle manipulator comprised of a bellows actuator with a source of pressurized fluid and a controlling valve with a computer control system and with tendon cables adjustable by motorized winches.

FIG. 7 shows a first embodiment of the present invention in the form of a tentacle-like manipulator indicated generally by reference numeral 111, which comprises a tapered bellows 110. A proximal end of the manipulator 111 is larger in cross-section than the distal end. Alternatively, a non-tapered bellows actuator may be used for the manipulator, according to another embodiment of the present invention.

The bellows 110 is similar in construction to the bellows 10 of FIG. 5 and will therefore not be described in detail. As is apparent from a comparison of FIGS. 5 and 7, the bellows 110 has star-shaped chambers 112 each formed of six chamber segments 114, and the chamber segments 114 are formed of triangular wall portions 118 and quadrilateral wall portions 120 connected along fold lines similar to the corresponding parts of the bellows 10 of FIGS. 1 to 6. The bellows 110 is illustrated as comprising eight star-shaped chambers 112, but this number may be varied.

Figure 8:
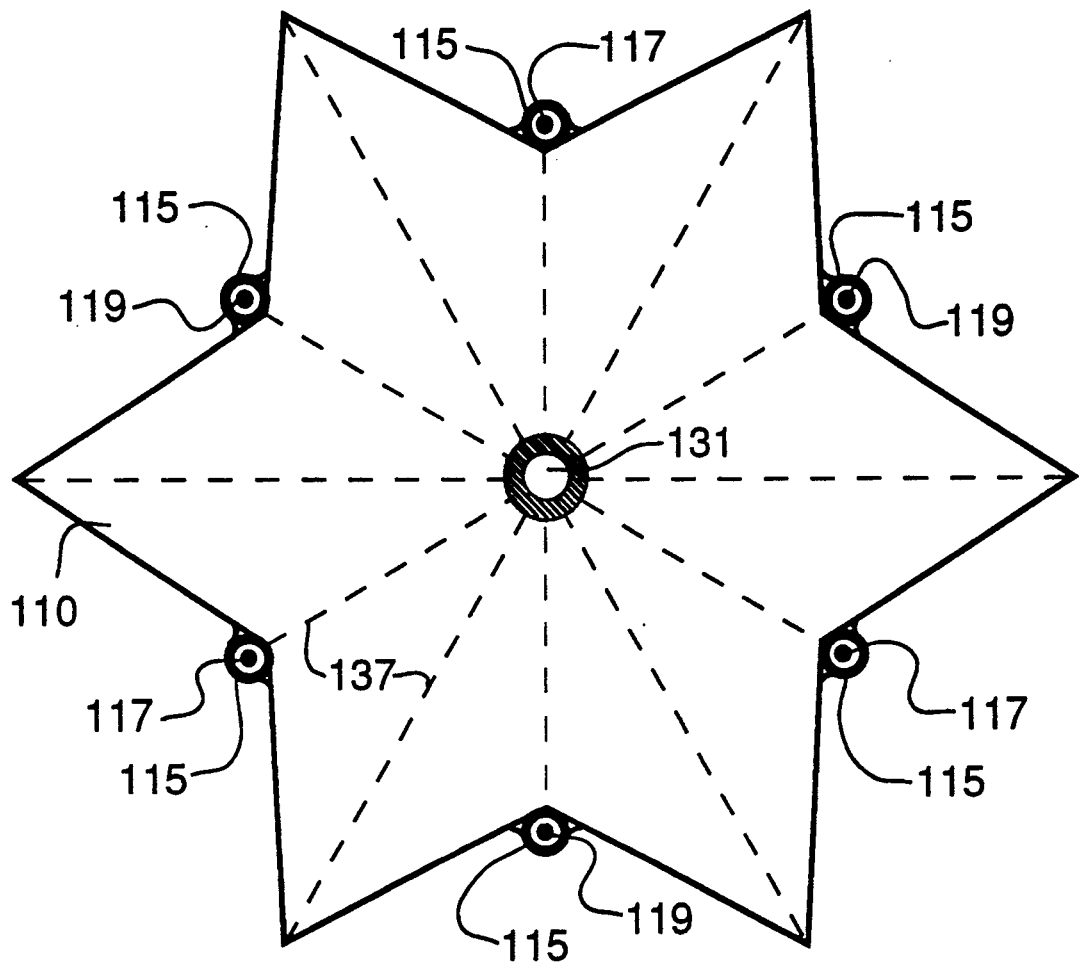
FIG. 8 shows a cross-sectional interior view of the proximal region of the manipulator of FIG. 7, taken along the line B—B of FIG. 7 and illustrating six tendon cable guides and six tendon cables arrayed around the axis of the bellows.

Referring now to FIG. 8, which shows a view taken in section along the line B—B of FIG. 7, it will be seen that the six-pointed star-shaped chamber 112 shown therein has a cable guide 115 fixed to the exterior of the bellows at each junction between each adjacent pair of the chamber segments 114, so that six of the cable guides 115 are equiangularly distributed about the axis of the bellows 110. The cable guides 115 are made of short lengths of Nylon tubing and are attached to the bellows 110 by Nylon webbing (not shown) and glue (not shown).

As shown in FIG. 7, the manipulator 111 has three tendon-like flexible tension members in the form of cables 117 extending the entire length of the bellows 110 and slidingly guided through the cable guides 115 at each of the bellows chambers 112, the three cables 117 being equiangularly distributed about the bellows axis.

The manipulator 111 also includes three further tendon-like flexible members in the form of cables 119 which are shorter than the cables 117, and which are slidingly guided through cable guides 115 at only the first four chambers 112.

Figure 7A:
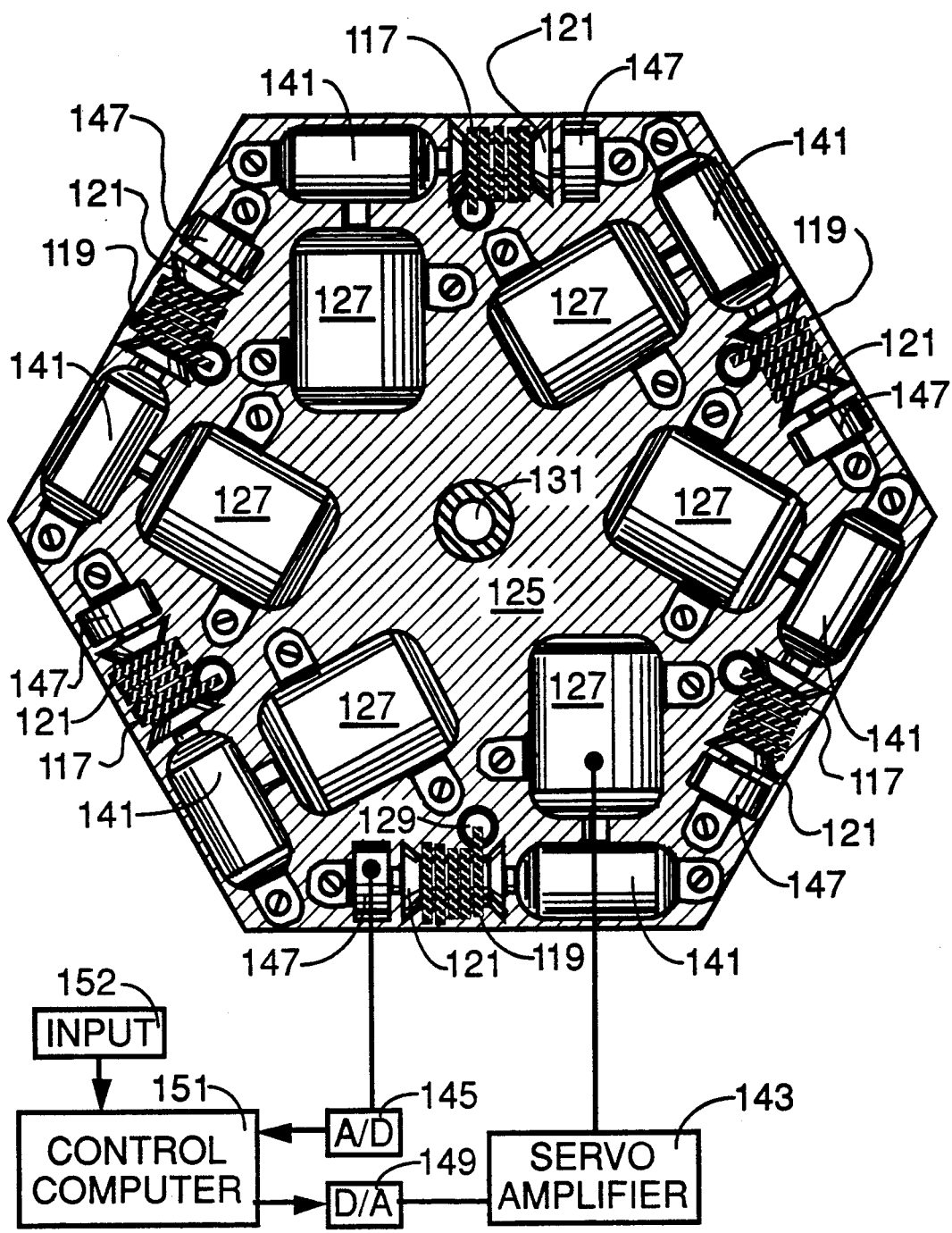
FIG. 7A shows an underneath plan view of the manipulator of FIG. 7.
Figure 7B:
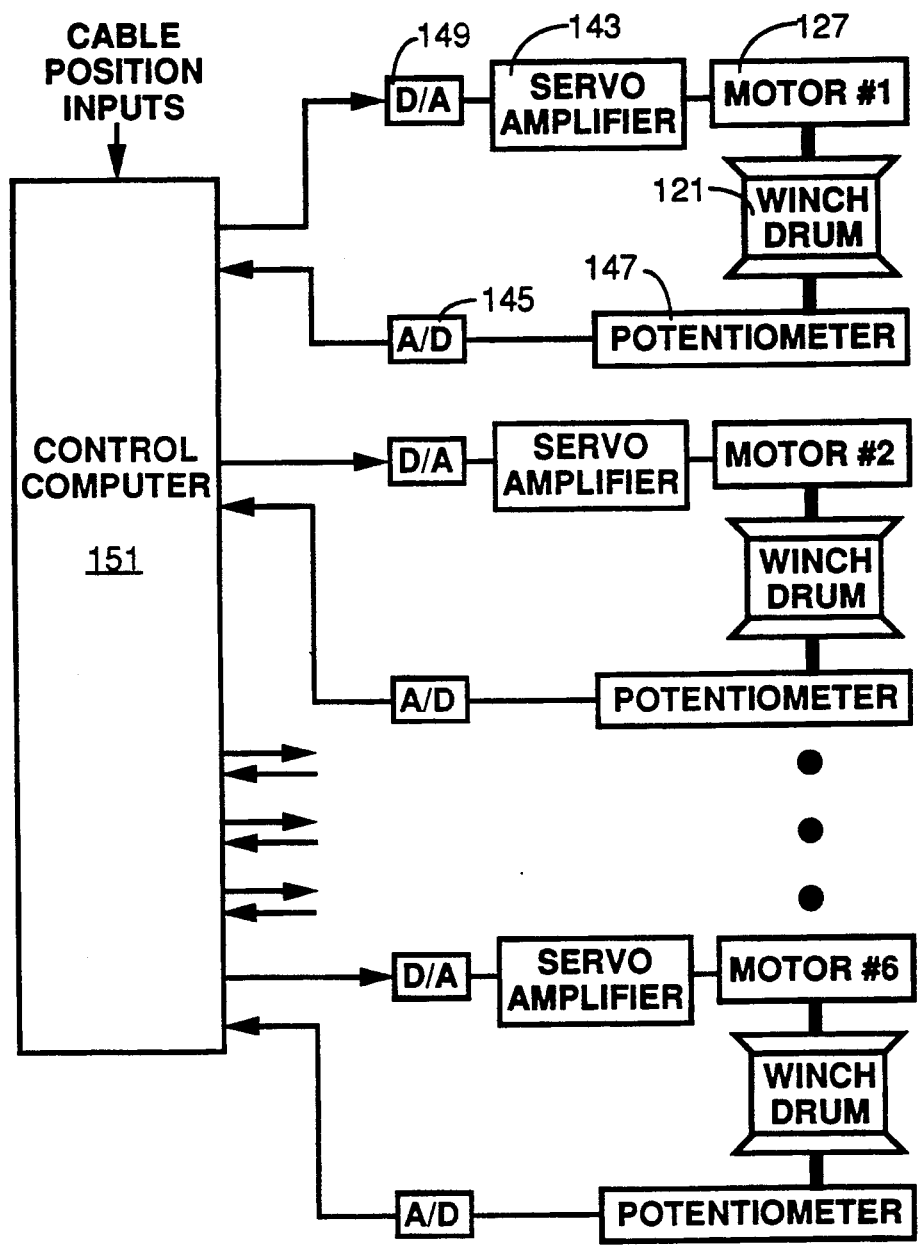
FIG. 7B is a circuit diagram showing parts of the manipulator of FIGS. 7 and 7A.

The cables 117 and 119 are terminated at their distal ends by swaged ferrules 113 which are large enough to anchor the cables and to prevent them from slipping through the adjacent cable guides 115. The cables 117 and 119 are wound onto winch drums 121 at the proximal ends of the manipulator 111. As can be seen in FIGS. 7A and 7B, each of the cables is provided with one of the winch drums 121.

The manipulator 111 includes a plate 123 at its distal end and a plate 125 at its proximal end. Distal plate 123 is attached to the distal end of bellows 110 and serves as a distal terminus for the three longer tendon cables 117. Distal plate 123 also serves as a mounting surface for any end-effector or other device which may be attached to the tentacle manipulator 111. Proximal plate 125 is attached to the proximal end of bellows 110 and acts as a supporting base for the manipulator 111. Proximal plate 125 also serves as a mounting surface for winch motors 127 which rotate the winch drums 121 to control the tensioning of the cables 117 and 119. The cables 117 and 119 pass through holes 129 in proximal plate 125 and then the cables 117 and 119 are wrapped onto the winch drums 121. The centre of the proximal plate 125 also serves as a support for a fluid fitting 131 (shown in a cut-away view through the bellows 110), which attaches to the proximal end of the bellows 110.

The manipulator 111 is able to extend in length by the inflation of the bellows 110 through the fluid fitting 131. A source 133 of pressurized fluid provides the fluid through a controlling valve 135 to the fluid fitting 131. In order to permit extension of bellows 110 to occur, the tendon cables 117 and 119 must be loosened by unreeling them from the winch drums 121.

The manipulator 111 can be contracted in length by reeling the cables 117 and 119 onto the winch drums 121. In order to maintain or reduce fluid pressure in the bellows 110 during this contraction, the controlling valve may opened to allow fluid to leave the bellows through the fluid fitting 131 and to be exhausted through an exhaust duct 137. Thus, it is generally true that extension of the manipulator 111 is effected by increasing fluid pressure (or volume) inside the bellows 110, whereas contraction of the manipulator 111 is principally by means of motorized winding of the cables 117 and 119 onto the winches and by releasing fluid pressure or volume from the interior of bellows 110.

The pressure in the interior of the bellows 110 is sensed by a pressure sensor 157 connected too the fluid fitting 131. The pressure sensor 157 provides an output signal, corresponding to this pressure, through an analog-to-digital converter 144 to a control computer 150, where it is compared with control data supplied to the computer 150 through an input 153. A corresponding error signal is supplied thorough a digital-to-analog converter 148 to a servo amplifier 142 controlling the servo valve 135, which in turn controls fluid flow into the bellows 110 from the pressure source 133 and from the bellows 110 through the exhaust duct 137.

If the fluid used inside bellows 110 is pressurized gas, then it is possible to permanently seal the bellows and to simplify the design by omitting the fluid fitting 131, the controlling valve 135 and the pressure source 133. The simplified design, where the bellows 110 acts as an air spring, allows shortening of the tendon-like cables to contract the manipulator, while the re-expansion of gas in the bellows provides the force to extend the manipulator when the cables are unreeled from the winches. However, it should be noted that the preferred means of controlling the compliance (stiffness) of the manipulator is through controlling fluid pressure inside the bellows by means of the controlling valve 135 and pressure source 133.

Each of the winch drums 117 is driven by its d.c. motor 127 through a reduction gearing 141. Multi-turn potentiometers 147 are connected to the winch drums 117 so as to provide outputs corresponding to the positions of rotation of the winch drums 117 and, thus, to the winding and unwinding of the cables 117 and 119 and the corresponding contraction, expansion and bending of the bellows 110.

The outputs of the potentiometers 147 are converted into digital signals by analog-to-digital converters 145, and the digital signals are input into a control computer 151. In the present embodiment of the invention, the computer 151, and also the computer 150, employ a Motorola MC68HC11 industrial microprocessor. However, the invention is not restricted to such microprocessors and the computers 150 and 151 may be based on any general purpose digital microprocessor, e.g. such as the Motorola 68020, 68030 or 68040 or Texas Instruments TMS320C30.

In the control computer 151, the digital signals representing the desired cable positions are compared with control data input through an input device 152. The results of these comparisons, in the form of error signals, are supplied to digital-to-analog converters 149, the outputs of which control servo-amplifiers 143 which, in turn, control the operation of the d.c. motors 127.

Figure 7C:
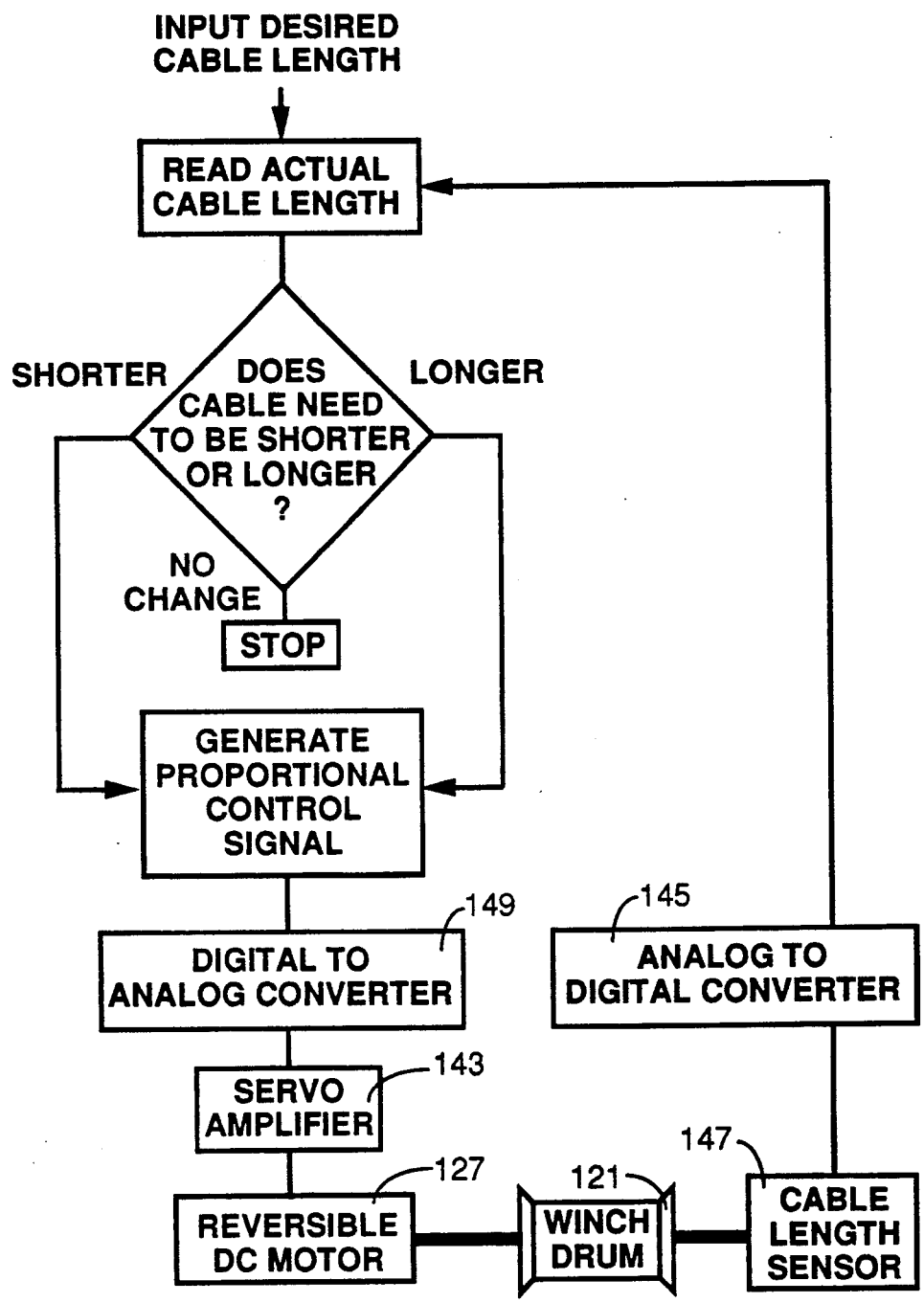
FIG. 7C is a flow chart illustrating the operation of parts of the manipulator of FIGS. 7, 7A and 7B.

More particularly, as illustrated in FIG. 7C, which shows a flow chart of a closed loop feedback control algorithm executed by the computer 151 for controlling the winding and unwinding of one of the cables 117 and 119, the control data from the input 152, representing the desired adjustment of the cable, is firstly compared with the digitally converted output of the cable length sensor potentiometer 147. If the desired and actual values of the cable adjustment are equal, the algorithm will stop. Otherwise, a decision is made to make the effective cable length longer or shorter, as appropriate, and a corresponding proportionate control signal is generated, which represents the magnitude and direction of the cable adjustment needed. Since the feedback control is a real-time sampling system, the proportional control signal will continuously change as the cable length is adjusted. When the cable adjustment has been completed, the proportional signal is zero.

The digital control signal is input to the digital-to-analog converter 149. The corresponding low level analog signal from the latter is then fed to the dc motor 127 to correspondingly rotate the respective winch drum 121.

As the winch drum 147 rotates, the respective potentiometer 147 is also rotated by the same amount to provide the signal representing the actual adjustment of the cable. The remainder of the cables 117 and 119 are similarly adjusted by their respective winch drums 121 under the control of the computer 151.

The control of the pressure in the interior of the bellows 110 is effected by the computer 150 using an algorithm which is similar to that of the flow chart of FIG. 7B and which is therefore not further described or illustrated herein.

An end effector in the form of a pinching gripper 159 is shown, by way of example, mounted on the plate 123. However, the gripper 159 may be replaced by another type of end effector, for example a suction gripper, a wrench, pinchers, a spot welder, a cutting torch or another industrial tool or attachment.

The base 125, in the present embodiment of the invention, forms part of a box 160, which is diagrammatically illustrated by dash-dot lines in FIG. 7. The box 160 supports the manipulator and houses the d.c. motors 127, the reduction gearings 141, the winch drums 121 and the potentiometers 147.

The tendon-like cables 117, which extend the entire length of the manipulator, are used to control the extension and bending of a distal portion of the manipulator. The tendon-like cables 119, which extend from the base to the middle of the manipulator, are used to control the extension and bending of a proximal portion of the manipulator.

FIG. 8 shows a view in section along the line B—B of FIG. 7, through the bladder 110. The cable guides 115 are attached to the bladder 110 at each valley between the star-shaped points and extend around the cables 117 and 117, allowing the cables to slide through the cable guides 117. The bladder membrane fold lines 137 are also shown, in broken lines.

FIG. 9 shows, in a relatively contracted state, a manipulator indicated generally by reference numeral 111a which is identical to the manipulator 111 except that it has a modified bellows 110a with a relatively greater number of chambers 112 along the axis of the bellows. The additional chambers allow greater bending curvature of the manipulator. The motorized winches, the pressure source and valve are omitted for clarity. The cables 117, of which only one is shown, are again terminated at the distal end by ferrules 113 and run the entire length of the tentacle through the cable guides 115, which hold the cables to the sides of the bellow, while allowing the cables to slide. The cables 119 are distally terminated by ferrules 113 at approximately the midpoint of the bellows actuator 110a.

FIG. 10 provides a view of the manipulator 111a in a relatively extended state. FIG. 10 is in every way identical to FIG. 9, except that the tendon-like cables 117 and 119 have been loosened to allow bellows 110a to increase in volume by extending along its longitudinal axis. The force of extension is provided by fluid pressure in the interior of the bellows 110a, while the amount of extension is controlled by the cables 117 and 119. To achieve linear extension (i.e. no bending of the manipulator), at least the three tendon cables 117 must be loosened in unison. This provides extension of only the distal half of the manipulator. FIG. 10 depicts tentacle extension by simultaneously loosening all six cables. This allows greater extension of the manipulator since both the distal and proximal regions of the bellows can elongate.

Figure 11:
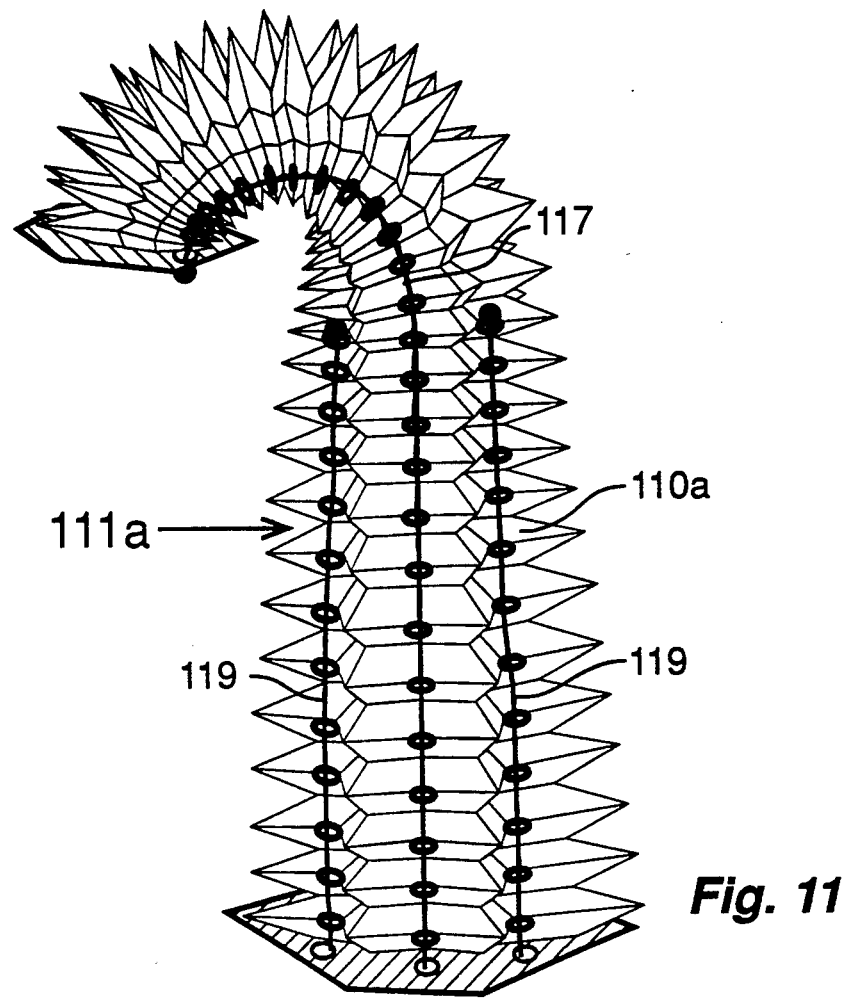
FIG. 11 shows a view corresponding to that of FIG. 10, but with a distal region of the manipulator curved while a proximal region of the manipulator remains straight.
Figure 12:
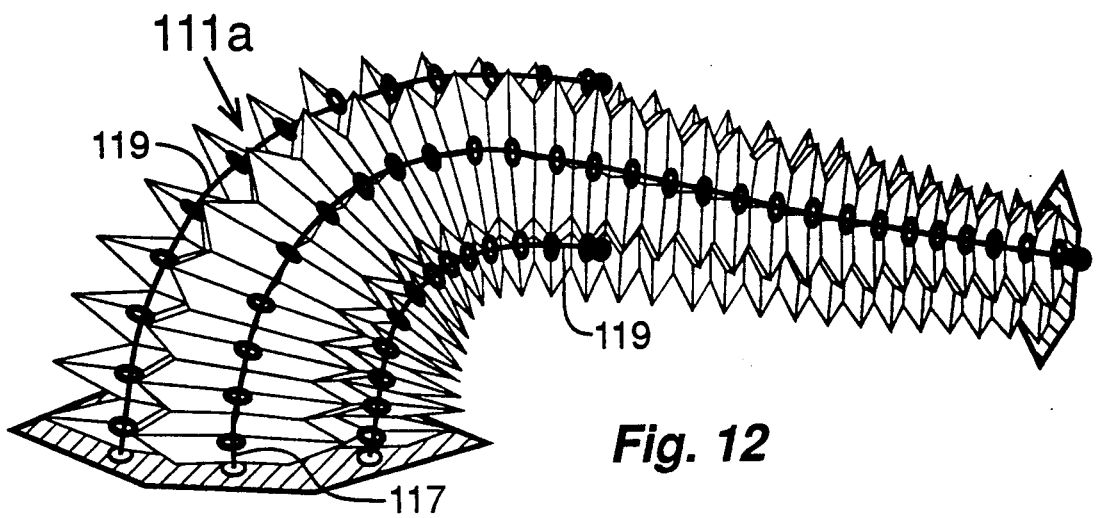
FIG. 12 shows a view corresponding to that of FIG. 10, but with the proximal region of the manipulator curved while the distal region of the manipulator remains straight.

FIGS. 11 and 12 each provide a view of manipulator 111a with a single curvature; FIG. 11 shows the tentacle with a curve of approximately 180 degrees in the distal region and FIG. 12 shows the tentacle with a curve of approximately 90 degrees in the proximal region. FIGS. 11 and 12 show that the manipulator 111a can achieve bending of either the distal or proximal regions while the adjacent remaining one of these regions remains relatively straight. The bending in either the distal or proximal region may be in any direction. The amount of curvature and the radius of curvature of the bend in a region of the tentacle is regulated by the three cables that control the bend in that region. Thus, a 180 degree bend may be with a large radius or a smaller radius, depending on the adjustments of the cables which control the bending.

The bending of the distal region of the manipulator 111a as shown in FIG. 11 is accomplished by differentially tensioning the cables 117 in the appropriate manner. When the cable 117 shown in FIG. 11 is reeled in by its cable winch 121, the bellows 110a is caused to curl towards the side of that cable, thus bending the manipulator. The two other cables 117 can also be differentially tensioned to control the amount and direction of curvature of the distal region of manipulator 111a. As the cables 117 are tightened, they bend the manipulator in the distal region by gathering the articulating folds of the bellows 110 and thus contracting that side of the manipulator and causing it to bend. The adjustment of the cables 117 does not directly affect the curvature or length of the proximal region of the manipulator. The cables 117 not only bend the distal region of the manipulator, but also control the overall length of the distal region of the manipulator. Thus, a bending in the distal region can be effected with the bellows in the relatively extended condition, or with the bellows in the relatively contracted condition for a short, tight bend.

The bending of the proximal region of the manipulator as shown in FIG. 12 is accomplished by differentially winding-in cables 119 in the appropriate manner. When one of the two cables 119 shown in FIG. 12 are reeled in by their cable winches 121, the bellows 110a is caused to curl towards the side of that one of the cables, thus bending the manipulator. In the proximal bend shown, the uppermost cable 119 is relatively long while the lowermost cable 119 has been shortened, thus causing the manipulator to bend. The third cable 119 (not visible in FIG. 12), is differentially adjusted to obtain the desired proximal bending of the manipulator. As the cables 119 are wound-in, they tend to bend the manipulator in the proximal region by gathering the articulating folds of bellows 110a and thus contracting that side of the manipulator and causing it to bend. When the cables 119 are adjusted to control the bending of the proximal region of manipulator, it may be also necessary also to adjust the cables 117 to maintain or alter the bending of the distal region of manipulator, since proximal bending may also interactively effect the tensioning of the cables 117, which control bending in the distal region.

Figure 13:
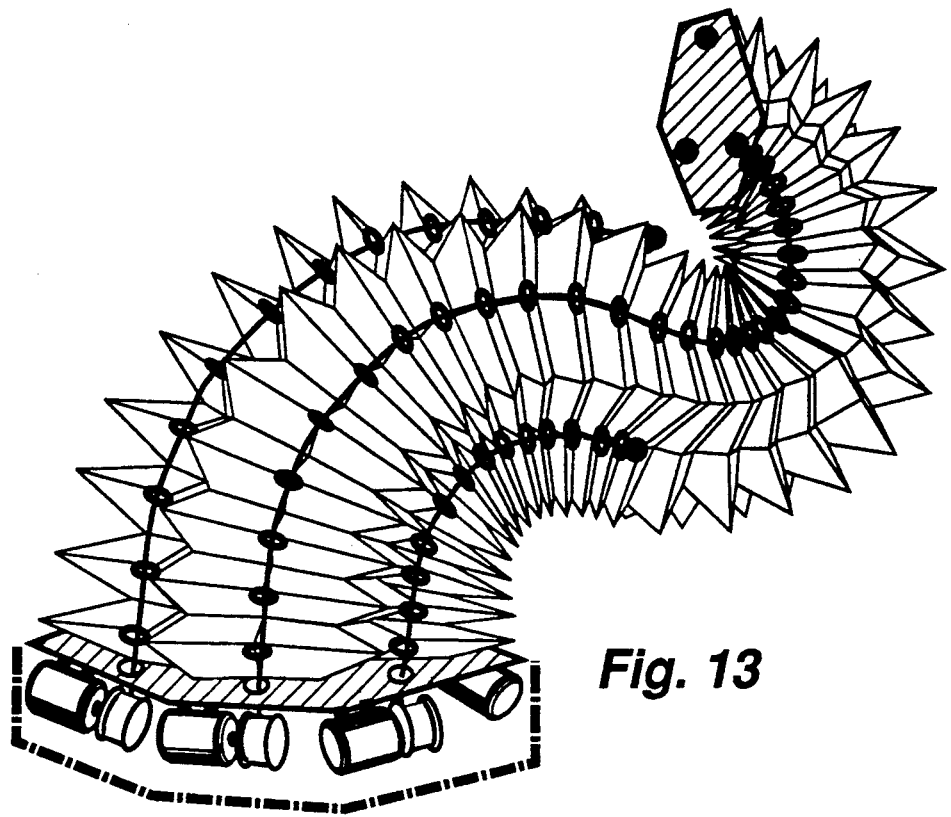
FIG. 13 shows a view corresponding to that of FIGS. 11 and 12, but with both the proximal and distal regions of the manipulator curved in different directions.

FIG. 13 shows a view of manipulator 111a undergoing simultaneous bending in both the distal and proximal regions. In a manner similar to that shown in FIG. 11, distal region bending is accomplished by differentially tensioning cables 117 in the appropriate manner. However, for the cables 117 to cause the distal region to curl, the cables 117 must also follow the bend of bellows 110a in the proximal region. Adjusting the cables 117 by winding them onto their winch drums 121 does not cause contraction of one side of the proximal region of bellows. Rather, the cables 117 simply slide through their cable guides 18 without changing the bend of the proximal region. However, shortening of the cables 117 tends to gather the distal-most chambers of the bellows, contracting one side of the distal region and causing the bellows to bend in the distal region.

The bending of the proximal region of bellows as shown in FIG. 13 is accomplished by differentially winding in the cables 119 in the same manner as explained above with reference to FIG. 12. When the cables 119 as shown in FIG. 13 are reeled in by their cable winches 121, the bellows is caused to curl towards the side of the contracting cable, thus bending the manipulator. In the proximal bend shown, the uppermost cable 119 is relatively unwound while the lowermost tendon cable 119 has been wound up so as to cause the manipulator to bend. As the cables 119 are adjusted to control bending of the proximal region, it may be also necessary to adjust the cables 117 to maintain or alter the bending of the distal region of bellows, since proximal bending may also interactively effect the tensioning of the cables 117, which control bending in the distal region.

Figure 14:
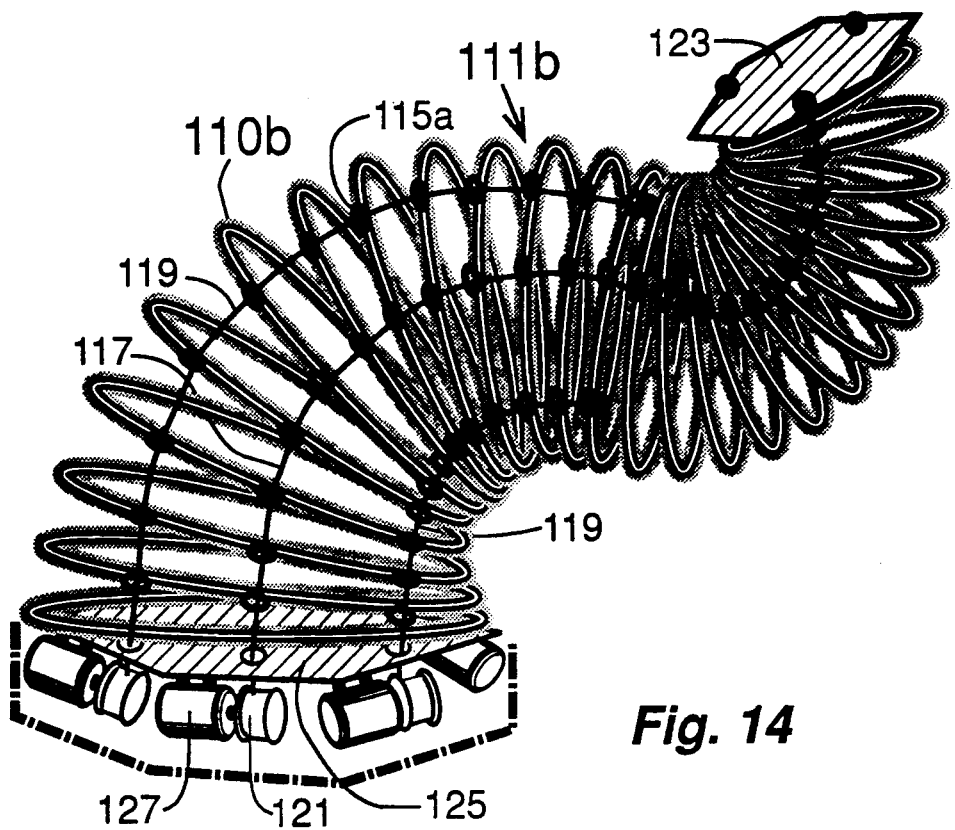
FIG. 14 shows a view in perspective of a further tentacle-like manipulator, according to a third embodiment of the present invention, having both proximal and distal regions curved in different directions, the manipulator comprising a helically coiled spring tapered from the proximal to the distal end, and tendon cables adjusted to varying lengths appropriate to control curvature of the tentacle, the tendon cable adjustment means being omitted for clarity.

FIG. 14 illustrates a tentacle-like manipulator, indicated generally by reference numeral 111b, according to a third embodiment of the invention, which also exhibits simultaneous bending in both the distal and proximal regions. In a manner similar to that shown in FIG. 13, distal region bending is accomplished by differentially winding in cables 117 in the appropriate manner, and proximal region bending is accomplished by differentially winding in the cables 119.

The manipulator 111b of FIG. 14 is configured similarly to the manipulator 110a of FIG. 13, except that a helically coiled steel spring 110b has been substituted for the bellows 110a. The manipulator 111b is able to extend in length by elongation of the spring 110b. The cables 117 and 119 are used to compress the spring 110b in length, or to cause the spring 111b to bend in a particular direction, thus causing the manipulator 111b to also bend. The cables 117 and 119 slide through cable guides 115a, which are each formed from wire wrapped around a respective one of the coils of the spring 110b so as to provide a free hoop or loop through which the respective cable can slide. The spring 110b, being a compression spring, functions in a manner analogous to the above-mentioned sealed bellows actuator, which acts as a passive air spring. The use of helical spring 110b in place of the bellows obviates any need for a fluid supply to operate the manipulator 111b. Instead of steel, the spring 110b may be made of other spring metal or, for light duty or toy applications, of plastic spring material.

As will be apparent to those skilled in the art, various other modifications of the above-described embodiments may be made within the scope of the invention as defined in the appended claims.

For example, although the use of a tapered bellows has been described above, a non-tapered bellows may alternatively be employed. In a like manner, other forms of actuators which can be bent, such as bellows of either polygonal or circular cross-sections, may be adopted. It is also possible to substitute a bendable coiled spring, or other passive spring, for the bellows. It is possible that two or more bellows may be adjoined in tandem fashion, allowing the extension and bending forces to be varied along the length of the manipulator. The tendon-like cables need not be terminated on winches at the base of the manipulator, but may instead be attached to winches along the length of the manipulator. The tendon cables may be placed on the outside or on the inside of the bellows actuator, and it is also possible that the cables may be adjusted by means other than spooling winches, for example by hydraulic cylinders, pneumatic cylinders, ball-screw positioners, solenoids, pneumatic muscle actuators or other linear actuator systems.

It is also envisaged that the present invention could be employed in a manipulator which wraps itself around objects, in the manner of an octopus, so as to grasp them or that two or more manipulators embodying the present invention could be arranged and adapted in the form of fingers in a grasping device.

Tentacle-like manipulators embodying the present invention may also be arrayed around a body section so as to function as walking or climbing legs in a mobile robot. In such an application, the distal ends of the manipulators could be equipped with feet or climbing/-grasping end effectors.

At least two tension members are required if it is desired that the tentacle-like manipulator be capable of controllable bending. However, if only extension or contraction of the manipulator is required, then a single tension member, preferably positioned on the central axis of the manipulator, may be employed.

If only one tension member extending to the distal end of the manipulator, and only one tension member extending to an intermediate portion thereof, were employed, then bending could be controlled only to the side at which each tension member is provided. Such an arrangement may be utilized, for example, as a finger in a robotic gripper preferably a non-adjustable tension member is in that case provided opposite from the adjustable tension members, which are provided adjacent one another.

Further, the invention includes embodiments employing tension members of three or more different lengths to provide bending in corresponding longitudinal portions of the manipulator.

I claim:

1. A tentacle-like manipulator, comprising:
   a resilient laterally bendable elongate member having a proximal end and a distal end;
   said elongate member being inflatable and being longitudinally extensible and contractible in response to pressure variations within said elongate member;
   means for varying the pressure within said elongate member and thereby longitudinally extending and contracting said elongate member; an end effector mounting provided at said distal end;
   a plurality of flexible tension members spaced around said elongate member and extending along said elongate member from said proximal end;
   means securing one end of said tension members to said elongate member at a distance from said proximal end;
   a plurality of guides spaced apart along and secured to said elongate member and slidably engaging said tension members for guiding said tension members relative to said elongate member; and
   tensioning means for adjustably tensioning said tension members by different amounts and thereby bending said elongate member.

2. A tentacle-like manipulator as claimed in claim 1, wherein said elongate member comprises a bellows having a plurality of bellows chambers located in succession along said elongate member.

3. A tentacle-like manipulator as claimed in claim 2, wherein said bellows chambers each comprise at least three chamber segments arranged around an axis, each of said chamber segments comprising a radially outwardly extending protrusion, said protrusion comprising four chamber wall portions, said four chamber wall portions merging with one another along a pair of first fold lines which extend peripherally of said bellows chamber and a pair of second fold lines which extend radially of said bellows chamber, said chamber wall portions of each of said chamber segments merging with respective ones of said wall portions of adjacent ones of said chamber segments along pairs of third fold lines which extend radially of said bellows chamber, said chamber wall portions of each of said chambers merging with said chamber wall portions of adjacent chambers along pairs of fourth fold lines, said fourth fold lines being parallel to and spaced inwardly of respective ones of said first fold lines and said first, second and third pairs of fold lines meeting at radially outermost apexes of said chamber segments, said bellows actuator being expansible and contractible along the axis by flexure of said wall portions relative to one another about said first, second, third and fourth fold lines in response to pressure changes within said bellows chamber.

4. A tentacle-like manipulator as claimed in claim 2, wherein said bellows tapers towards said distal end along the length thereof.

5. A tentacle-like manipulator as claimed in claim 1, wherein said means for varying the pressure in said elongate member include a source of pressurized fluid, a fluid duct connecting said source to the interior of said bellows and a servo valve for regulating the flow of pressurized fluid through said duct.

6. A tentacle-like manipulator as claimed in claim 1, wherein said tension members comprise first flexible tension members extending along said elongate member to the distal end thereof and second flexible tension members extending along said elongate member to an intermediate portion thereof located between said proximal end and said distal end.

7. A tentacle-like manipulator as claimed in claim 6, wherein said tensioning means comprise a plurality of winch drums respectively associated with said first and second tension members and electric motors for rotating said winch drums and thereby winding and unwinding said first and second tension members onto and from said winch drums.

* * * * *